E. SCHNEIDER.
PISTON FOR HEAT ENGINES.
APPLICATION FILED FEB. 14, 1918.

1,306,839.

Patented June 17, 1919.

Inventor.
Eugène Schneider
By
Mauro, Cameron, Lewis & Massie,
Attorneys.

UNITED STATES PATENT OFFICE.

EUGÈNE SCHNEIDER, OF PARIS, FRANCE, ASSIGNOR TO SCHNEIDER & CIE., OF PARIS, FRANCE, A LIMITED JOINT-STOCK COMPANY OF FRANCE.

PISTON FOR HEAT-ENGINES.

1,306,839.    Specification of Letters Patent.    Patented June 17, 1919.

Application filed February 14, 1918. Serial No. 217,202.

*To all whom it may concern:*

Be it known that I, EUGÈNE SCHNEIDER, a citizen of the French Republic, and a resident of 42 Rue d'Anjou, Paris, France, have invented new and useful Improvements in Pistons for Heat-Engines, which invention is fully set forth in the following specification.

This invention has for its object to provide an improved piston for heat engines and other apparatus, which is divided transversely in a known manner into two elements assembled by means of bolts, which construction facilitates as is well known, the manufacture of the piston, and obviates having to replace it entirely in the case of wear or damage of its parts that come in contact with hot gases in working.

This invention consists in improvements in pistons of this type. These improvements while assuring a perfect assemblage between the two elements of the piston, and a suitable rigidity of the assembled piston, are designed on the one hand to facilitate the expansion, and, it may be, also the deformation of the element that is exposed directly to the action of the hot gases, and on the other hand the admission and circulation of a cooling medium.

An embodiment of this invention is illustrated in the accompanying drawings in which.

Figure 1:
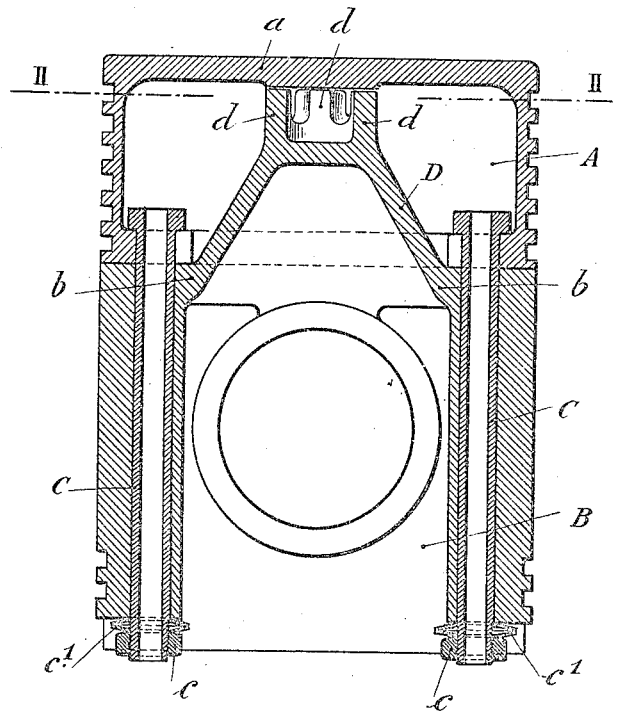
Figure 1 is a central longitudinal section of the improved piston.
Figure 2:
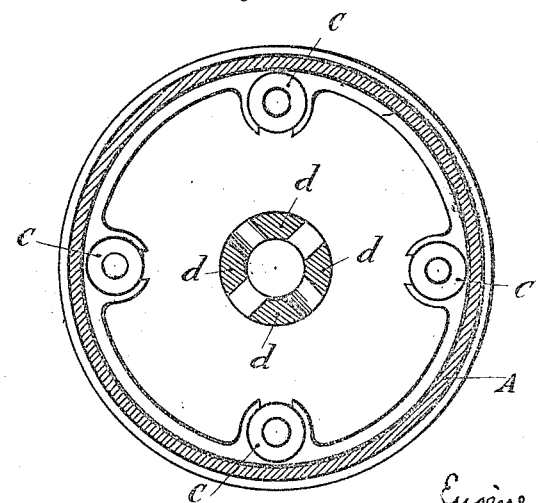
Fig. 2 is a cross section on the line II—II of Fig. 1.

As shown, the improved piston is divided transversely in a known manner into two elements A and B assembled by means of bolts C.

According to the present improvements the outer or lower (as the case may be) element B of the piston, hereinafter termed the piston body, is formed at its forward end with an extension D projecting from the center of an internal rib or diaphragm $b$. This extension is adapted to engage in the cavity of the inner or upper (as the case may be) element A of the piston. The top or outer end of the extension D comes alone in contact with the end $a$ of the element A, for instance through the intermediary of ribs $d$. The support of the end $a$ of the piston upon the piston body B is thereby assured, while allowing to the greatest possible extent the expansion or deformation of the said end under the action of the hot gases with which it comes into contact.

On the other hand, the shanks of the assembling bolts C are tubular and are thus adapted to serve as ducts for the admission and circulation of a fluid for cooling the end $a$ and adjacent parts. $c^1$ are Belleville washers which may be located between the bolt nuts $c$ and seated on the piston body B, for the purpose of compensating for the expansion of the tubular bolts C.

What I claim is:—

1. A piston comprising a piston body, and a hollow piston head removably secured thereto, said body having an end extension adapted to form an outer closure for said head and to project into supporting contact with the working end thereof whereby said piston head is free to expand longitudinally.

2. In a transversely divided piston for heat engine cylinders, the combination of a hollow inner piston element open at its outer end, an outer piston element, and means for assembling said inner piston element and said outer piston element, said outer piston element having a central extension projecting from said outer piston element into the hollow of said inner piston element and formed at its apex end with ribs, adapted to bear against the inside end surface of said inner piston element in the assembled piston, whereby said inner piston element is firmly fixed to said outer piston element with complete freedom of longitudinal expansion.

3. In a transversely divided piston for heat engine cylinders, the combination of a hollow inner piston element open at its outer end, an outer piston element, and tubular bolts serving as ducts for the inflow and outflow of cooling fluid into and from said hollow inner piston element, for assembling said inner piston element and said outer piston element, said outer piston element having a central extension projecting from said outer piston element into the hollow of said inner piston element and adapted to bear against the inside end surface of said inner piston element in the assembled piston, whereby said inner piston element is firmly fixed to said outer piston element with complete freedom of longitudinal expansion.

In testimony whereof I have signed this specification.

EUGÈNE SCHNEIDER.

Witnesses:
ANDRÉ MOSTICKER,
CHAS. P. PRESSLY.